Feb. 3, 1925.

J. G. VINCENT

HYDROCARBON MOTOR

Filed Oct. 14, 1921

INVENTOR,
Jesse G. Vincent,
BY
ATTORNEY.

Feb. 3, 1925.

J. G. VINCENT 1,524,895

HYDROCARBON MOTOR

Filed Oct. 14, 1921

Inventor,
Jesse G. Vincent,
By Milton Tibbetts,
Attorney.

Patented Feb. 3, 1925.

1,524,895

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed October 14, 1921. Serial No. 507,611.

*To all whom it may concern:*

Be it known that I, JESSE G. VINCENT, a citizen of the United States, and resident of Detroit, Wayne County, State of Michigan, have invented certain new and useful Improvements in Hydrocarbon Motors, of which the following is a specification.

This invention relates to hydrocarbon motors and particularly to generator mounting and driving mechanism therefor.

One of the objects of the invention is to provide a generator mounting means that will permit ready removal.

Another object of the invention is to provide a generator driving and mounting mechanism that will permit the generator to be removed without removing the gear support.

Another object of the invention is to provide a generator mounting that will permit the generator to be removed and disconnected from its driving gear without changing the adjustment of the gear.

Another object of the invention is to provide a gear support and means adjacent thereto for retaining it on its support.

Another object of the invention is to provide a generator gear support in the crank case of a motor with means on an adjacent web of the crank case for retaining the gear against endwise movement.

Other objects of the invention will appear from the following description taken in connection with the drawings, which form a part of this specification, and in which.

Figure 2:
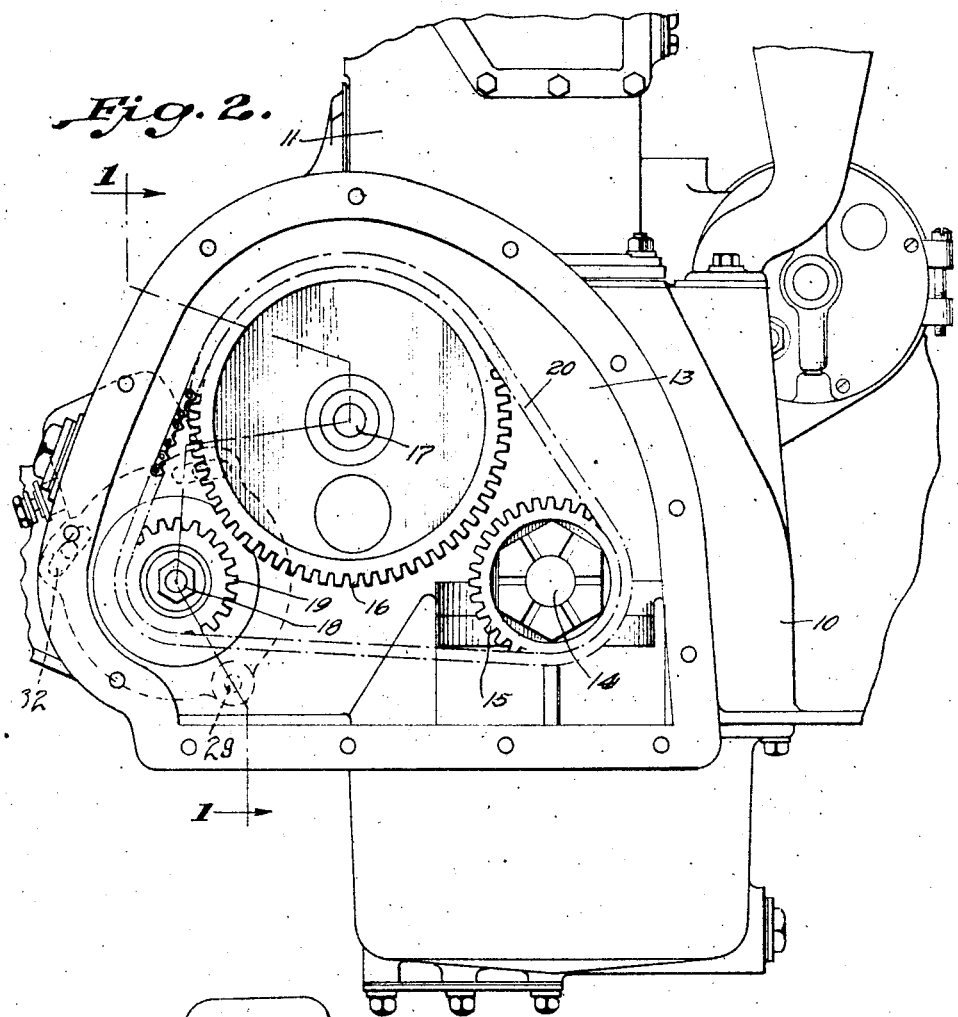
Fig. 2 is a front elevation of the motor shown in Fig. 1, with the front cover removed.

Referring to the drawings 10 represents the crank case of a hydrocarbon motor upon which the cylinders 11 (Fig. 2) are mounted. At one end of the motor, preferably the front end, the crank case is formed with a gear compartment 13 into which the front end of the motor crank shaft 14 extends. A pinion 15 is secured to the front end of the crank shaft and a gear 16 is secured to the cam shaft 17 which also extends into the compartment 13. A third shaft 18 also extends into this compartment and a gear 19 is connected to it for driving it. A chain 20 connects the gears or sprockets 15, 16 and 19 in a three-cornered arrangement so that the crank shaft 14 drives both the cam shaft 17 and the shaft 18.

Figure 1:
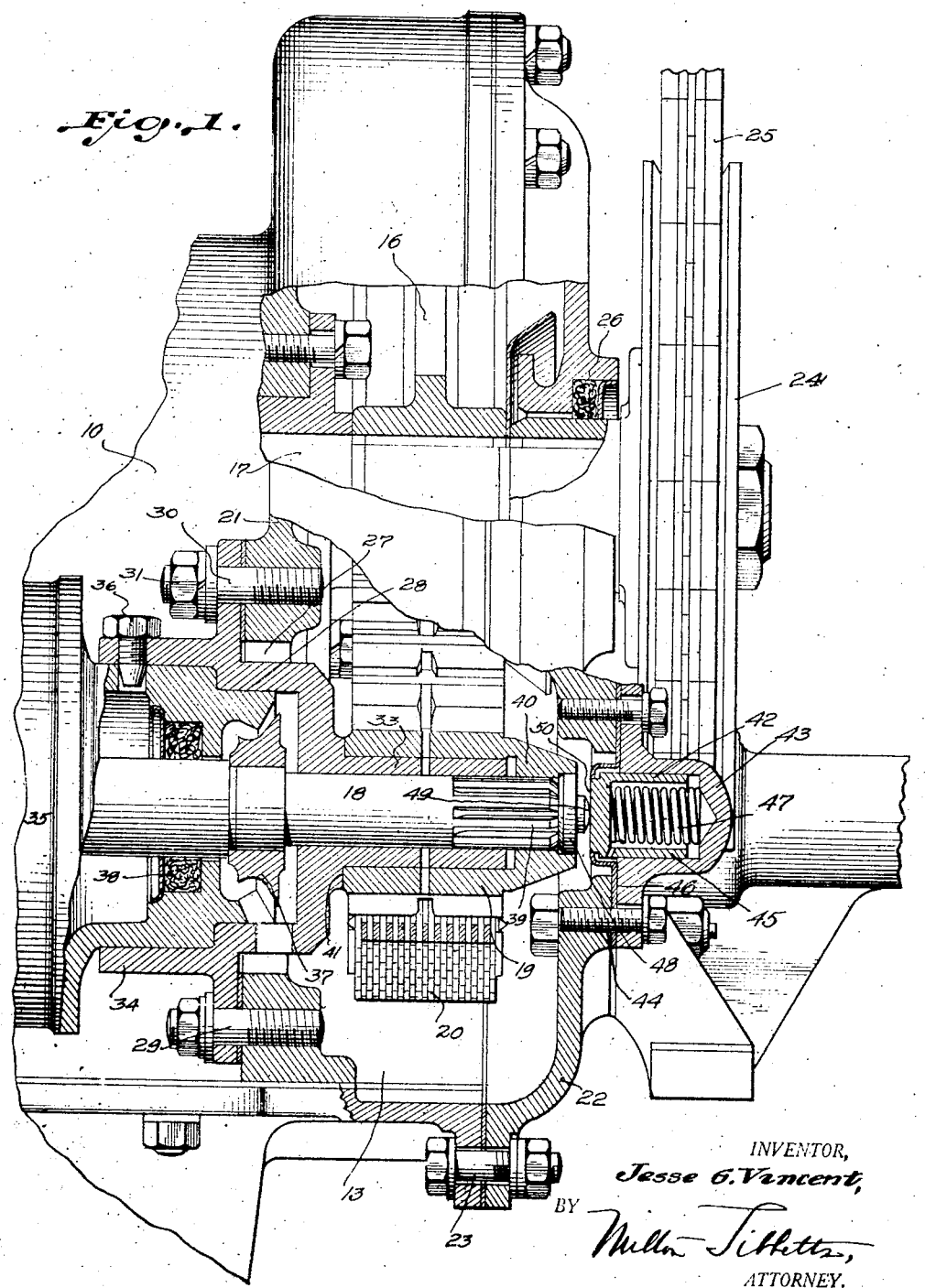
Fig. 1 is a side elevation and sectional view of a hydrocarbon motor embodying the invention, the sections being substantially on the line 1—1 of Fig. 2.

In Fig. 1 a cross section of the compartment 13 is shown and one web or wall thereof is shown at 21 while the other web or wall is comprised by a cover 22 which is detachably secured to the crank case as by a series of bolts and nuts 23. This front cover has been removed in the view shown in Fig. 2 but is in place in Fig. 1. It will be seen also by referring to Fig. 1, that the camshaft 17 extends through this cover 22 and upon its outer end is a pulley 24 which drives a belt 25 which may connect with the radiator fan for driving the latter. Suitable packing 26 prevents escape of oil from the compartment around the cam shaft.

Figure 3:
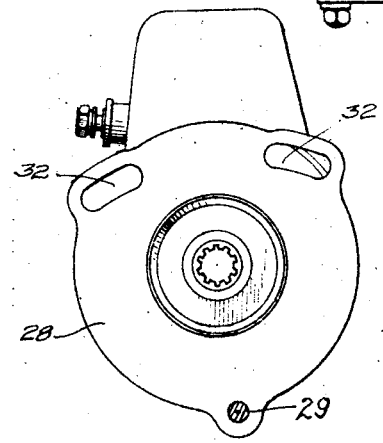
Fig. 3 is a front elevation of the generator unit and the bracket upon which it is mounted.

The web 21 above referred to is formed with an opening 27 which is closed by a bracket 28 pivoted on a stud 29 and secured in adjusted position by one or more studs 30 with their nuts 31. A front view of the bracket 28 is shown in Fig. 3 and it will be seen that the arc shaped slots 32 thereof permit rocking of the bracket about the stud 29 so that it may be moved toward or from the cam shaft 17. This is particularly evident by referring to Fig. 2. Thus the chain 20 may be tightened or loosened by thus adjusting the bracket 28. Of course the opening 27 is large enough to permit of this adjustment of the bracket therein without coming in contact with the wall of the opening.

The bracket 28 is formed with an inwardly projecting part 33 and an outwardly projecting part 34, the periphery of the inner part forming a bearing for the gear 19 above referred to and the outer part 34 forming a support for a generator 35 of suitable form. The generator may be retained in the bracket as by a removable bolt 36.

The shaft 18 above referred to is the armature shaft of the generator 35 and it is shown as extending through and having a bearing in the portion 33 of the bracket 28. A suitable throw-off ring 37 and packing 38 prevent the lubricant from getting into the shell of the generator.

The forward end of the shaft 18 is splined as shown at 39 and it extends into a splined extension 40 on the gear 19 so that the shaft may be removed axially from its direct connection to the gear. When the parts are in the position shown in Fig. 1, the gear will, of course, drive the generator shaft 18, the gear and shaft being concentrically mounted on and in the bracket 28. By this construction and arrangement it will be seen that the generator 35 with its shaft 18, may be entirely removed from the bracket 28 and from connection with the gear 19 and at the same time the adjustment of the gear 19 relative to the cam shaft 17 is not altered as it is not necessary to interfere with the adjusted position of the bracket 28.

The gear 19 is retained in position endwise on the part 33 of the bracket 28, first, by a shoulder 41 at one end of the gear, and second by a thrust device or bearing 42 at the other end of the gear. This thrust device comprises a cap 43 removably secured to the cover 22 as by bolts 44, a thimble 45 slidably mounted in the cap 43, a retaining plate 46, and a spring 47 inside the thimble 45. A hardened button 48 is mounted in the end 40 of the gear 19 for cooperation with the thimble 45. The button 48 has a spherical surface 49 which operates against a flat surface 50 on the thimble 45. By this construction the bracket 28 may be adjusted, thus moving the button 48 eccentrically of the thimble 45, and yet, by reason of these spherical and flat surfaces the button will always find a suitable thrust surface to operate upon on the thimble 45. The spring 47 is under sufficient tension to yieldingly retain the gear 19 in position on the bracket 28, and the retainer 46 will hold the thimble 45 in place when the bracket 28, and with it the gear 19, is removed for repair or replacement.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:—

1. In a hydrocarbon motor, the combination with the motor crank case, of an adjustable bracket secured to the crank case, a gear mounted to rotate on said bracket, a generator removably mounted upon said bracket, and a concentric connection between the armature shaft of said generator and said gear.

2. In a hydrocarbon motor, the combination with the motor crank case, of an adjustable bracket secured to the crank case, a gear mounted to rotate on said bracket, a generator removably mounted upon said bracket, and a direct sliding and detachable connection between the armature shaft of said generator and said gear.

3. In a hydrocarbon motor, the combination with the crank case having two separated webs of a generator bracket adjustably secured to one of the said webs and having a part extending into the space between said webs, a gear mounted upon said part, and a thrust bearing in the opposite web adapted to retain said gear on said part.

4. In a hydrocarbon motor, the combination with the crank case having two separated webs, of a generator bracket adjustably secured to one of said webs and having a part extending into the space between said webs, a gear mounted upon said part, and a spring thrust device secured to the opposite web and adapted to yieldingly retain said gear on said part.

5. In a hydrocarbon motor, the combination of an adjustable bracket, a driving gear supported thereby, and a generator supported by the bracket with its armature shaft having a bearing in the bracket, said driving gear and shaft being concentrically connected.

6. In a hydrocarbon motor, the combination of an adjustable bracket, said bracket having a projecting part forming a bearing for a gear and an oppositely projecting part forming a generator support, a driving gear on said bearing part, and a generator on said supporting part, said generator having its armature shaft borne directedly by said bracket and connected concentrically to said gear.

7. In a hydrocarbon motor, the combination of a support having a projecting part forming a bearing, a gear mounted on said bearing, means independent of the supporting bearing for retaining the gear on the bearing, and a generator having its armature shaft extending through said bearing into driving relation with said gear.

8. In a hydrocarbon motor, the combination of a support having a projecting part forming a bearing, a gear mounted on said bearing and having a splined end extending beyond the bearing, and a generator having its armature shaft splined and extending through said bearing into driving relation with said gear.

9. In a hydrocarbon motor, the combination with the crank case, of a bracket adjustably mounted thereon, a gear supported by the bracket, and a thrust bearing for the gear supported by the crank case.

10. In a hydrocarbon motor, the combination of an adjustable bracket, a gear so mounted thereon that the adjustment of the bracket moves the axis of the gear laterally, a device connected to be driven by the gear, and a thrust bearing for the gear mounted for non-adjustment with the bracket.

11. In a hydrocarbon motor, the combination with the crank case, of a generator bracket adjustably mounted thereon and having a bearing, a gear mounted on said bearing and having an extended end, a button in the end of said gear, a thrust device mounted for contact with said button to retain the gear on the bearing, and a generator mounted in said bracket with its shaft connected to said gear.

In testimony whereof I affix my signature.

JESSE G. VINCENT.